(12) United States Patent
Slaney et al.

(10) Patent No.: US 7,527,833 B2
(45) Date of Patent: May 5, 2009

(54) BIAXIAL FILM

(75) Inventors: Kim Slaney, Dorset (GB); Mark Verrall, Wiltshire (GB); Owain Parri, Poole (GB); Karl Skjonnemand, Southampton (GB); Tara Perrett, Bournemouth (GB)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 691 days.

(21) Appl. No.: 10/498,571

(22) PCT Filed: Nov. 6, 2002

(86) PCT No.: PCT/EP02/12393

§ 371 (c)(1),
(2), (4) Date: Jun. 14, 2004

(87) PCT Pub. No.: WO03/054111

PCT Pub. Date: Jul. 3, 2003

(65) Prior Publication Data

US 2005/0219447 A1  Oct. 6, 2005

(30) Foreign Application Priority Data

Dec. 12, 2001  (EP) .................. 01129682

(51) Int. Cl.
G03C 1/76 (2006.01)
G03C 1/492 (2006.01)
G03C 1/494 (2006.01)
C09K 19/52 (2006.01)
C09K 19/00 (2006.01)

(52) U.S. Cl. ............... 428/1.1; 430/270.1; 252/299.01
(58) Field of Classification Search ............ 252/299.01; 428/1.1; 430/270.1
See application file for complete search history.

(56) References Cited

U.S. PATENT DOCUMENTS

| 5,989,461 A | 11/1999 | Coates et al. |
| 6,217,955 B1 | 4/2001 | Coates et al. |
| 6,319,963 B1 | 11/2001 | Coates |
| 2006/0193999 A1* | 8/2006 | Verall et al. .................. 428/1.1 |

FOREIGN PATENT DOCUMENTS

| EP | 0 982 605 | 3/2000 |
| GB | 2 329 900 | 4/1999 |
| JP | 08 209127 | 12/1996 |
| WO | WO 97 35219 | 9/1997 |
| WO | WO 01 20393 | 3/2001 |

OTHER PUBLICATIONS

Advanced Materials, vol. 11, No. 7, 1999, pp. 573-578, XP002237446.
Patent Abstracts of Japan, vol. 1996, No. 12, Dec. 26, 1996.

* cited by examiner

*Primary Examiner*—Geraldina Visconti
(74) *Attorney, Agent, or Firm*—Millen, White, Zelano & Branigan, P.C.

(57) ABSTRACT

The invention relates to an optically biaxial film with cholesteric structure, methods and materials for its preparation, its use as retardation or compensation film in optical devices like liquid crystal displays, and to compensators and liquid crystal displays comprising such a biaxial retardation film.

17 Claims, 11 Drawing Sheets

A)   B)

BIAXIAL FILM

FIELD OF INVENTION

The invention relates to an optically biaxial film with cholesteric structure, methods and materials for its preparation, its use in optical devices like compensators and liquid crystal displays, and to a compensator or liquid crystal display comprising such a biaxial film.

BACKGROUND AND PRIOR ART

Optical compensators are used in prior art to improve the optical properties of liquid crystal displays (LCD), such as the contrast ratio and the grey scale representation at large viewing angles. For example in uncompensated displays of the TN or STN type at large viewing angles often a change of the grey levels and even grey scale inversion, as well as a loss of contrast and undesired changes of the colour gamut are observed.

An overview of the LCD technology and the principles and methods of optical compensation of LCDs is given in U.S. Pat. No. 5,619,352, the entire disclosure of which is incorporated into this application by way of reference. As described in U.S. Pat. No. 5,619,352, to improve the contrast of a display at wide viewing angles a negatively birefringent C-plate compensator can be used, however, such a compensator does not improve the greyscale representation of the display. On the other hand, to suppress or even eliminate grey scale inversion and improve the grey scale stability U.S. Pat. No. 5,619,352 suggests to use a birefringent O-plate compensator. An O-plate compensator as described in U.S. Pat. No. 5,619,352 includes an O-plate, and may additionally include one or more A-plates and/or negative C-plates.

The terms 'O-plate', 'A-plate' and 'C-plate' as used in U.S. Pat. No. 5,619,352 and throughout this invention have the following meanings. An 'O-plate' is an optical retarder utilizing a layer of a positively birefringent (e.g. liquid crystal) material with its principal optical axis oriented at an oblique angle with respect to the plane of the layer. An 'A-plate' is an optical retarder utilizing a layer of uniaxially birefringent material with its extraordinary axis oriented parallel to the plane of the layer, and its ordinary axis (also called 'a-axis') oriented perpendicular to the plane of the layer, i.e. parallel to the direction of normally incident light. A 'C-plate' is an optical retarder utilizing a layer of a uniaxially birefringent material with its extraordinary axis (also called 'c-axis') perpendicular to the plane of the layer, i.e. parallel to the direction of normally incident light.

Negative birefringent C-plate retarders in prior art have been prepared for example from uniaxially compressed films of isotropic polymers, by vapour deposition of inorganic thin films, as described for example in U.S. Pat. No. 5,196,953, or from negatively birefringent liquid crystal materials. However, stretched or compressed polymer films often show only moderate birefringence and require high film thickness, vapour deposition requires complicated manufacturing procedures, and negatively birefringent liquid crystal materials are often less easily available and more expensive than positively birefringent materials.

To overcome these disadvantages, it has recently been suggested, for example in WO 01/20393 and WO 01/20394, to use a cholesteric liquid crystal film with short pitch, typically with its Bragg reflection band in the UV region of the electromagnetic spectrum. Such a film exhibits negative birefringent C-type retardation for wavelengths greater than its reflection maximum. The refractive index ellipsoid of this type of film approximates to that of a vertically aligned liquid crystal with negative birefringence. Such a retardation film can be used for example to cancel off-axis retardation in the homeotropically driven dark state of a TN-LCD, and thus significantly improve the viewing angle of the LC display.

WO 01/20393 discloses a compensator that is a combination of a planar A-plate, an O-plate and a negative C-plate, wherein the negative C-plate comprises a short-pitch cholesteric LC film. When used for example in a TN-LCD, this combination provides excellent contrast at horizontal viewing angles and reduces unwanted changes of the colour gamut. However, its performance at vertical viewing angles is limited. Furthermore, the use of multiple retardation films is expensive and raises manufacturing and durability problems.

One aim of the present invention is to provide an optical compensator which has improved performance for compensation of LCDs, is easy to manufacture, in particular for mass production, and does not have the drawbacks of prior art compensators as described above. Other aims of the present invention are immediately evident to the person skilled in the art from the following detailed description.

The inventors have found that the above described problems can be solved, and an optical compensator with superior performance can be obtained, by combining multiple films in a single layer and by using a biaxial C-plate retarder. It was found that a biaxial negative C-plate retarder in its optical properties approximates to a combination of a planar A-plate and a negative C-plate, but shows better optical performance than such a combination. The in-plane anisotropy of the biaxial negative C-plate retarder ($\Delta n_{xy}$) approximates to the A-plate and the out-of-plane anisotropy ($\Delta n_{xz}$ and $\Delta n_{yz}$) to the negative C-plate. Simulations have shown that the optical performance of the biaxial negative C-plate retarder is surprisingly superior to that of the A-plate and negative C-plate stacked sequentially, and shows exceptionally good viewing-angle performance for liquid crystal displays. Furthermore, the use of a single biaxial film instead of two stacked films reduces costs and manufacturing problems.

DEFINITION OF TERMS

In connection with optical polarisation, compensation and retardation layers, films or plates as described in the present application, the following definitions of terms as used throughout this application are given.

The term 'cholesteric structure' or 'helically twisted structure' relates to a film comprising one or more layers of liquid crystal material wherein the mesogens are oriented with their main molecular axis in a preferred direction within molecular sublayers, with this preferred orientation direction in different sublayers being twisted around a helix axis that is substantially perpendicular to the film plane, i.e. substantially parallel to the film normal. This definition also includes orientations where the helix axis is tilted at an angle of up to 2° relative to the film normal.

The term 'tilted structure' or 'tilted orientation' means that the optical axis of the film is tilted at an angle θ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

The term 'planar structure' or 'planar orientation' means that the optical axis of the film is substantially parallel to the film plane. This definition also includes films wherein the optical axis is slightly tilted relative to the film plane, with an average tilt angle throughout the film of up to 1°, and which exhibit the same optical properties as a film wherein the optical axis is exactly parallel, i.e. with zero tilt, to the film plane.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

The tilt angle of a splayed film hereinafter is given as the average tilt angle $\theta_{ave}$, unless stated otherwise.

The term 'homeotropic structure' or 'homeotropic orientation' means that the optical axis of the film is substantially perpendicular to the film plane, i.e. substantially parallel to the film normal. This definition also includes films wherein the optical axis is slightly tilted at an angle of up to 2° relative to the film normal, and which exhibit the same optical properties as a film wherein the optical axis is exactly parallel, i.e. with no tilt, to the film normal.

For sake of simplicity, an optical film with a tilted, splayed, planar, twisted or homeotropic orientation or structure is hereinafter also shortly referred to as 'tilted film', 'splayed film', 'planar film', 'twisted film' and 'homeotropic film', respectively.

Tilted and splayed films will also be referred to as 'O plate'. A planar film will also be referred to as 'A plate' or 'planar A plate'.

In tilted, planar and homeotropic optical films comprising uniaxially positive birefringent liquid crystal material with uniform orientation, the optical axis of the film as referred to throughout this invention is given by the orientation direction of the main molecular axes of the mesogens of the liquid crystal material.

In a splayed film comprising uniaxially positive birefringent liquid crystal material with uniform orientation, the optical axis of the film as referred to throughout this invention is given by the projection of the orientation direction of the main molecular axes of the mesogens onto the surface of the film.

"E-mode" refers to a twisted nematic liquid crystal display (TN-LCD) where the input polarisation lies substantially along the director of the liquid crystal molecules when entering the display cell, i.e. along the extraordinary (E) refractive index. "O-mode" refers to a TN-LCD where the input polarisation lies substantially perpendicular to the director when entering the cell, i.e. along the ordinary (O) refractive index.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

Polymerisable compounds with one polymerisable group are also referred to as 'monoreactive' compounds, compounds with two polymerisable groups as 'direactive' compounds, and compounds with more than two polymerisable groups as 'multireactive' compounds. Compounds without a polymerisable group are also referred to as 'non-reactive' compounds.

SUMMARY OF THE INVENTION

One object of the present invention is a biaxial film having a cholesteric structure and a deformed helix with an elliptical refractive index ellipsoid, characterized in that it reflects light of a wavelength of less than 380 nm.

Another object of the invention is a method of preparing a biaxial film as described above and below.

Another object of the invention is the use of a biaxial film as described above and below as retardation or compensation film in optical devices like for example liquid crystal displays.

Another object of the invention is a compensator comprising a biaxial film as described above and below.

Another object of the invention is a liquid crystal display comprising a compensator or biaxial film as described above and below.

DETAILED DESCRIPTION OF THE INVENTION

Figure 1:
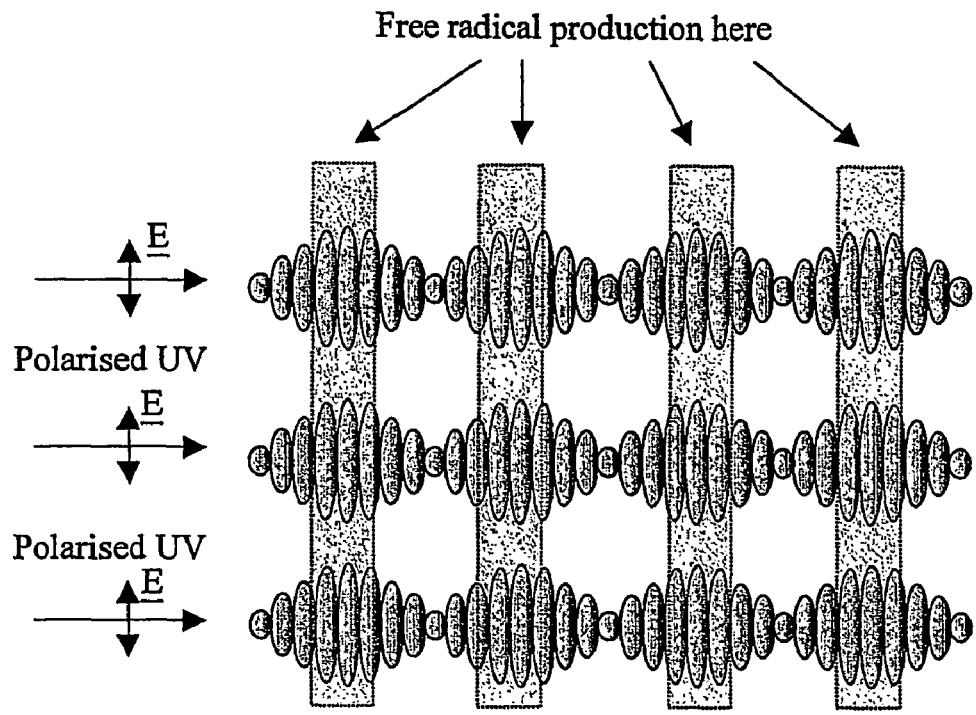
FIG. 1 illustrates a method of preparation of a biaxial film according to the present invention by photopolymerising a cholesteric material using polarised UV light.

When using a compensator comprising a biaxial film according to the present invention in an LCD, the contrast at large viewing angles and the grey level representation of the display are considerably improved, and grey scale inversion is suppressed. In case of coloured displays, the colour stability is considerably improved and changes of the colour gamut are suppressed. Furthermore, a compensator according to the present invention is particularly suitable for mass production.

Especially preferred is a biaxial retardation film which has optically biaxial negative C symmetry with $n_x \neq n_y \neq n_z$ and $n_x$, $n_y > n_z$, wherein $n_x$ and $n_y$ are the principal refractive indices in orthogonal directions in the film plane and $n_z$ is the principal refractive index perpendicular to the film plane.

Further preferred is a biaxial retardation film which is substantially transparent for light with a wavelength of 380 nm or higher, preferably for visible light from 380 to 780 nm.

The thickness of the biaxial film is preferably from 0.5 to 5 μm, very preferably from 1 to 3 μm.

The helical pitch is preferably chosen below 225 nm to achieve a reflection wavelength of smaller than 360 nm which is below visible wavelengths. The retardation of the biaxial film is preferably chosen according to the desired applications as exemplarily shown below and in the examples.

Preferably the biaxial film comprises a crosslinked cholesteric polymer.

The biaxial film according to the present invention can be manufactured for example by inducing helix deformation in a cholesteric liquid crystal (CLC) polymer film with short pitch (high twist). This can be achieved for example by photopolymerisation of a polymerisable cholesteric liquid crystal material that is coated onto a substrate and aligned into planar orientation, wherein the polymerisable material comprises a dichroic or liquid crystal photoinitiator and photopolymerisation is initiated by irradiation with linear polarised light, e.g. linear polarised UV light. As a result, the CLC helix is distorted during photopolymerisation. This method is described for the preparation of a long-pitch CLC polymer film by D. J. Broer et al., Adv. Mater. 1999, 11(7), 573-77. However, Broer et al. do not disclose cholesteric films having a reflection wavelength in the UV region.

Thus, another object of the invention is a method of preparing a biaxial retardation film as described above and below, by providing a layer of a chiral polymerisable liquid crystal material on a substrate, photopolymerising the polymerisable material that is homogeneously oriented in its liquid crystal phase by exposure to linear polarised light, and optionally removing the polymerised material from the substrate, wherein the chiral polymerisable liquid crystal material comprises at least one dichroic photoinitiator, at least one achiral polymerisable, and at least one chiral polymerisable or non-polymerisable compound.

Another object of the invention is a biaxial film with cholesteric structure obtainable by a method as described above and below.

Figure 2:
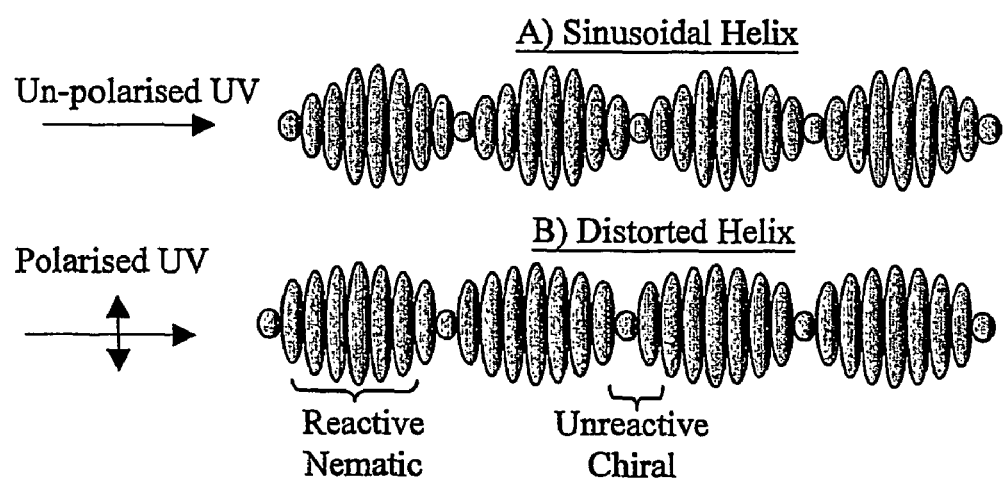
FIG. 2 illustrates the production of a sinusoidal cholesteric helix (A) by photopolymerisation with unpolarised UV light, and of a distorted helix (B) by photopolymerisation with polarised UV light.

The method of preparing a biaxial film is exemplarily described below and schematically illustrated in FIGS. 1 and 2.

The CLC mixture preferably contains a highly reactive nematic component and a low-reactive chiral component or vice versa. The LC photo-initiator locally aligns with its UV-absorbing axis parallel to the liquid crystal director. When illuminated with polarised UV light, polymerisation-initiating free radicals are predominantly produced where the local director lies parallel to the direction of polarisation (E), as depicted in FIG. 1.

Inhomogeneous free-radical production results in local polymerisation, predominantly of the highly reactive component. This results in concentration gradients between the high and low reactive components within a half turn of the helix, as shown in FIG. 2B. The highly reactive components become concentrated where the director lies parallel to the E-field (maximum concentration of free radicals) and the less reactive components where the director is perpendicular to the E-field. Localised variation of the chiral component results in distortion of the sinusoidal helix.

The previously reported, distorted helices have a long pitch in the order of the wavelength of light in the material. The wavelength of light in a cholesteric material is reduced by a factor of the refractive index compared to that outside the material. When the pitch of the helix equals the wavelength of light (inside the material) the Bragg reflection occurs according to the equation $p \approx n \times \lambda$, wherein p is the cholesteric pitch, n the mean refractive index and $\lambda$ the reflection wavelength. The distorted helices produce Bragg reflection bands in the visible spectrum in which linearly polarised light is transmitted, instead of circularly polarised light as usually observed in cholesteric materials, due to helix distortion.

Figure 3:
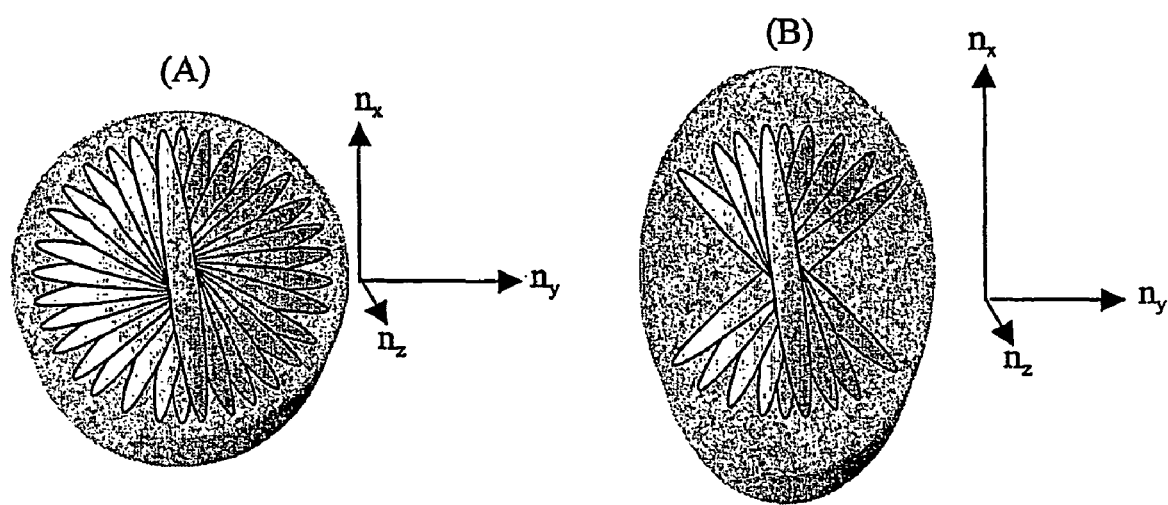
FIG. 3 depicts the refractive index ellipsoids of a cholesteric material with non-distorted (A) and distorted (B) cholesteric helix.

In the biaxial film according to the present invention the pitch is reduced values well below the visible wavelengths, so that only the average directional refractive indices are experienced. As a consequence the Bragg reflection bands occur in the UV, so the film is transparent to visible wavelengths of light and behaves purely as retarders for these wavelengths. Helix distortion in this case results in an elliptical, discotic refractive index ellipsoid (FIG. 3B) compared to a circular, discotic ellipsoid for a non-distorted helix (FIG. 3A). In contrast, the films with longer pitch as reported by Broer et al., Adv. Mater. 1999, 11(7), 573-77 behave as polarised reflectors or colour filters for visible wavelengths.

The short-pitch, sinusoidal (i.e. undistorted) helix in a cholesteric film of prior art produces a negative effective birefringence ($\Delta n_{z-xy}$) as shown by the discotic refractive index ellipsoid in FIG. 3A. The in-plane refractive indices are equal ($n_x = n_y$) and larger than the out-of-plane index ($n_z$) This produces an optically uniaxial, negative C-type structure. In contrast, in the short-pitch cholesteric films according to the present invention, helix distortion generates additional in-plane anisotropy ($\Delta_{nx-y}$) in the negative C-type structure, resulting in a refractive index ellipsoid as shown in FIG. 3B with biaxial, negative C-type symmetry with $n_x \neq n_y \neq n_z$ with $n_x$ and $n_y$ greater than $n_z$.

In this way a cholesteric film with optical biaxial negative C-type symmetry can be produced which can act as retarders for linear polarised light of wavelengths in the visible spectrum.

The biaxial film according to the present invention can be used alone or in combination with other retardation films as compensator for viewing angle compensation in LCDs.

Preferably the biaxial film is used in combination with an additional retarder selected from the group of A-plate, C-plate and O-plate retarders or films having planar, homeotropic, tilted or splayed structure. Especially preferably the biaxial film is used in combination with at least one O-plate retarder having tilted or splayed structure, very particularly preferably with splayed structure.

Another object of the invention is a compensator comprising at least one biaxial retardation film as described above and below, and optionally further comprising at least one O-plate retarder with splayed or tilted structure.

Suitable examples of O-plate retarders that can be used in a compensator according to the present invention and their manufacture are described in WO 01/20393, the entire disclosure of which is incorporated into this application by reference.

The individual optical films like polarisers and retarders can be laminated together, or connected by means of adhesive layers, like for example TAC or DAC (tri- or diacetylcellulose) films.

Another object of the present invention is a liquid crystal display comprising at least one biaxial film or compensator as described above and below.

Especially preferably the liquid crystal display device comprises the following elements
- a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
- a polariser arranged outside said transparent substrates, or a pair of polarisers sandwiching said substrates, and
- at least one biaxial film or compensator according to the present invention, being situated between the liquid crystal cell and at least one of said polarisers, it being possible for the above elements to be separated, stacked, mounted on top of each other or connected by means of adhesive layers in any combination of these means of assembly.

The biaxial film and compensator according to the present invention can be used for compensation of conventional displays, in particular those of the TN (twisted nematic), HTN (highly twisted nematic) or STN (super twisted nematic) mode, in AMD-TN (active matrix driven TN) displays, in displays of the IPS (in plane switching) mode, which are also known as 'super TFT' displays, in displays of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays.

Especially preferred are TN, STN, VA, MVA, OCB and pi-cell displays.

In the following, compensated displays according to preferred embodiments of the present invention are described.

Computer simulations as described below are performed using the Berreman 4×4 matrix method for stratified anisotropic media.

Twisted Nematic (TN) Mode

Figure 7:
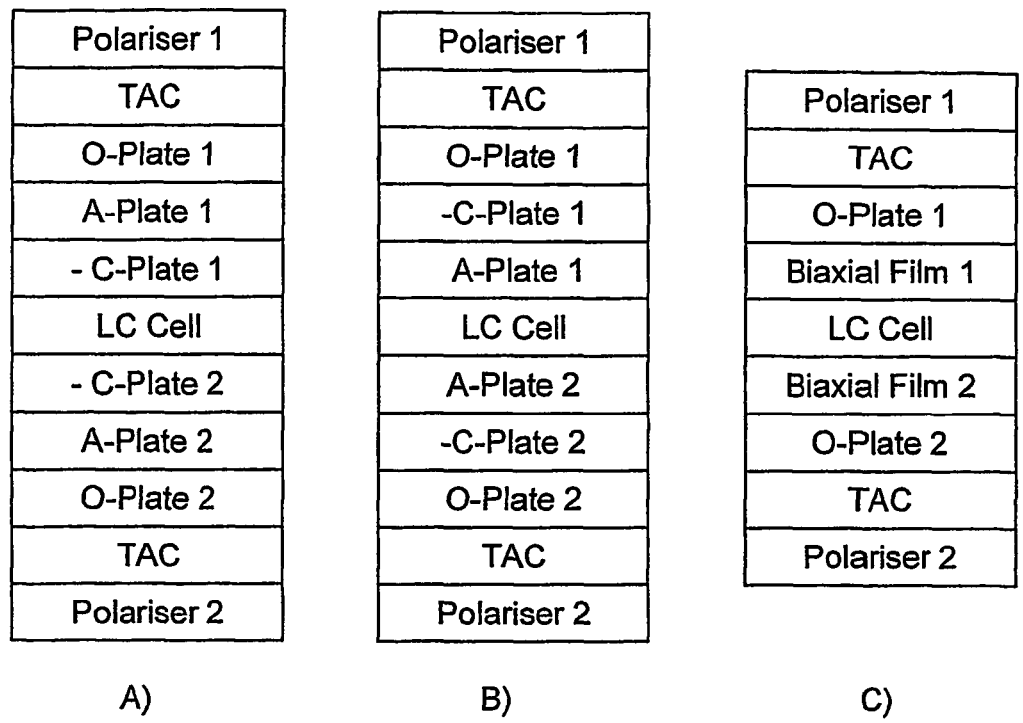
FIG. 7 schematically depicts a compensated TN-LCD according to prior art (A, B) and according to the present invention (C).

FIGS. 7A and 7B show a compensated TN display according to prior art, comprising an LC cell with a nematic liquid crystal mixture in twisted nematic orientation in the off-state, a compensator comprising a planar A-plate, a (uniaxial) negative C-plate and a splayed O-plate on each side of the cell, and two polarisers with their polarisation axes crossed at right angles sandwiching the cell and the compensators.

FIG. 7C exemplarily shows a compensated TN display according to a first preferred embodiment of the present invention, wherein, compared to FIGS. 7A and 7B, the compensator comprises a single biaxial negative C film according to the present invention instead of separate A-plate and negative C-plate retarders.

Computer simulations have shown that, in certain configurations, a compensator as shown in FIG. 7C significantly improves the optical performance of a TN display. The compensator configurations are dependent on the wave-guiding mode (O-mode or E-mode) and the relative position of the splayed and biaxial films. Modelling has also shown that the optical performance achieved with a compensator according to FIG. 7C, comprising a single biaxial film plus a splayed film, can be significantly better than that achieved with a compensator according to FIG. 7A or 7B, comprising separate A- and negative C-plates stacked sequentially with a splayed film.

In a compensation stack as shown for example in FIG. 7C, the ratio of the directional refractive indices of the inventive biaxial film is more important than their magnitude. For example, in case of a biaxial film with $n_x=1.65$, $n_y=1.55$ and $n_z=1.50$, excellent contrast is achieved with a film thickness of 1200 nm.

However, it is also possible for example to reduce the in and out-of-plane anisotropy ($\Delta n_{yz}$ and $\Delta n_{xy}$) by a factor, and to multiply the film thickness by the same factor, to obtain a film with substantially the same optical performance. This method is applicable to the biaxial films according to the present invention.

Multi-domain Vertically Aligned (MVA) Mode

Computer simulation has shown that a display of the MVA mode can be compensated to achieve 10:1 contrast ratio up to an angle of 80° in all viewing directions using a negative C-plate and an A-plate. This type of compensation also improves the colour performance, reducing the off-axis colour washout.

Figure 9:
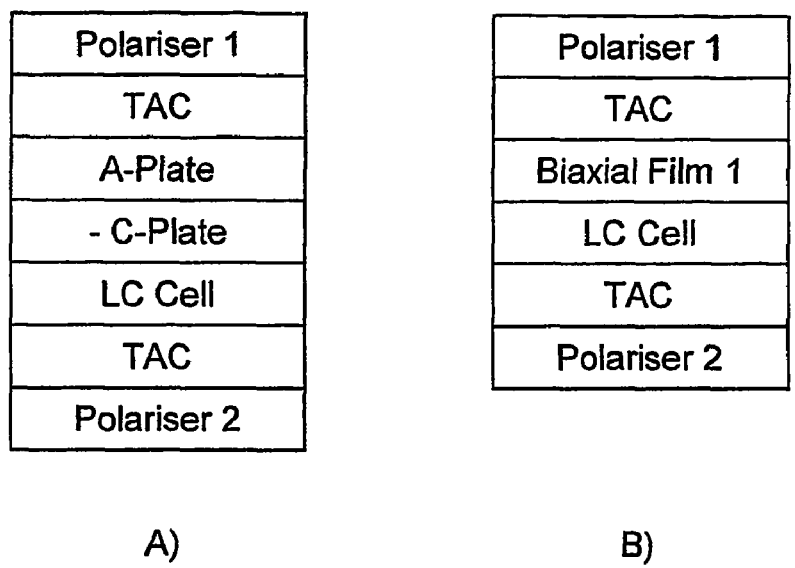
FIG. 9 schematically depicts a compensated MVA-LCD according to prior art (A) and according to the present invention (B).

FIG. 9A shows a compensated MVA display, comprising an LC cell with a nematic liquid crystal mixture in homeotropic orientation in the off-state, a compensator comprising a planar A-plate plus a (uniaxial) negative C-plate on one side of the LC cell, and two polarisers with their polarisation axes crossed at right angles sandwiching the cell and the compensator.

FIG. 9B exemplarily shows a compensated MVA display according to a second preferred embodiment of the present invention, comprising a homeotropic LC cell and a biaxial negative C film according to the invention on one side of the LC cell, sandwiched between two crossed polarisers.

As previously described, the combination of a negative C-plate and an A-plate (planar film) can be approximated as a biaxial negative C film. Application of a single biaxial negative C film to a display of the MVA mode as shown in FIG. 9B surprisingly results in improved contrast compared to the films applied separately as shown in FIG. 9A.

OCB or pi-Cell Mode

Figure 11:
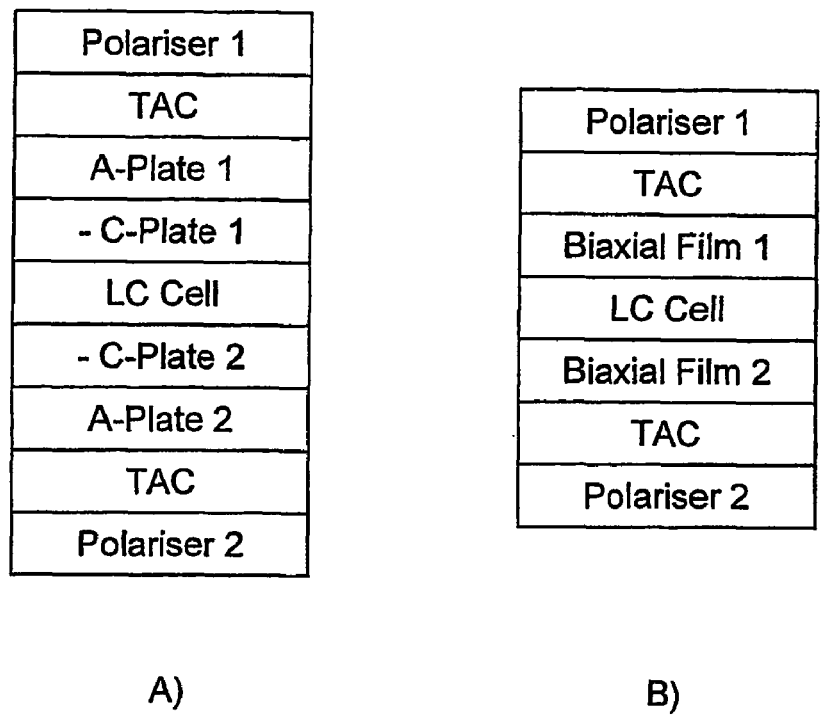
FIG. 11 schematically depicts a compensated OCB-LCD according to prior art (A) and according to the present invention (B).

FIG. 11A shows a compensated OCB mode display, comprising an LC cell with a nematic liquid crystal mixture with standard OCB configuration (homogeneous edge alignment and bent structure) in the off-state, a compensator comprising a planar A-plate plus a (uniaxial) negative C-plate on each side of the LC cell, and two polarisers with their polarisation axes crossed at right angles sandwiching the cell and the compensator.

FIG. 11B exemplarly shows a compensated OCB display according to a third preferred embodiment of the present invention, comprising an LC cell with bent structure, a biaxial negative C film according to the invention on each side of the LC cell, sandwiched between two crossed polarisers.

Computer simulations have shown that a single biaxial negative C film as shown in FIG. 11B can be used to replace a separate A-plate and negative C-plate as shown in FIG. 11A to yield comparable optical performance while reducing the number of different films in the stack.

In the above described preferred embodiments, the A-plate is preferably a film of polymerised liquid crystal material with planar structure. The negative C-plate is preferably a film of polymerised liquid crystal material with short-pitch cholesteric structure and reflection in the UV range. The O-plate is preferably a film of polymerised liquid crystal material with splayed structure. However, it is also possible to use other A-plate, C-plate and O-plate retarders known from prior art. Suitable films are disclosed for example in U.S. Pat. No. 5,619,352 or WO 01/20393.

The biaxial films according to the present invention can be prepared from polymerisable chiral liquid crystal materials that are developed to allow the reflection wavelength of the mixture to be below that of the light that is normally used for polymerisation (typically at about 365 nm) and to enable helix distortion. This is achieved for example by adding chiral components with high twist and/or in high amounts to push the Bragg reflection band into the UV, and for example to add a dichroic photoinitiator to enable helix distortion. In addition, the mixtures and materials according to the present invention allow to make the film production process suitable for manufacture on a plastic substrate, with a cure time of less than 5 minutes, which is especially suitable for mass production.

The polymerisable material is preferably a cholesteric liquid crystal (CLC) material. Preferably it comprises one or more achiral polymerisable mesogenic compounds and at least one chiral compound. The chiral compounds can be selected from non-polymerisable chiral compounds, like e.g. chiral dopants as used in liquid crystal mixtures or devices, polymerisable chiral non-mesogenic or polymerisable chiral mesogenic compounds. Especially preferred are chiral dopants that have a high helical twisting power, as they give short-pitch CLC mixtures even if used in low amounts.

Especially preferred is a chiral polymerisable LC mixture comprising
a) at least one polymerisable mesogenic compound having at least one polymerisable group,
b) at least one chiral compound which may also be polymerisable and/or mesogenic, and which may be one of the compounds of component a) or an additional compound,
c) at least one dichroic photoinitiator,
d) optionally one or more non-mesogenic compound having one, two or more polymerisable groups,
e) optionally one or more non-dichroic photoinitiators,
f) optionally one or more dyes showing an absorption maximum at a wavelength used to initiate photopolymerisation,
g) optionally one or more chain transfer agents, and
h) optionally one or more surface-active compounds.

The chiral polymerisable LC materials as described above and below are another object of the invention.

Preferably the achiral and chiral compounds have different number of reactive groups.

In a preferred embodiment of the present invention the polymerisable mesogenic material comprises at least one di- or multireactive chiral polymerisable mesogenic compound and at least one mono-, di- or multireactive achiral polymerisable mesogenic compound and.

In another preferred embodiment of the present invention the polymerisable material comprises at least one monoreactive chiral polymerisable mesogenic compound and at least one mono-, di- or multireactive achiral polymerisable mesogenic compound.

In another preferred embodiment the polymerisable material comprises at least one non-reactive chiral compound and at least one mono-, di- or multireactive polymerisable mesogenic compound.

If di- or multireactive compounds are present in the polymerisable material, a three-dimensional polymer network is formed. An optical retardation film made of such a network is self-supporting and shows a high mechanical and thermal stability and a low temperature dependence of its physical and optical properties.

By varying the concentration of the di- and multireactive compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

A preferred polymerisable LC mixture comprises
10-80% of one or more direactive achiral mesogenic compounds,
5-80% of one or more monoreactive achiral mesogenic compounds,
5-80% of one or more mono- or direactive chiral mesogenic compounds, and/or 1-20% of one or more non-reactive chiral compounds which may also be mesogenic,
0 to 10% of one or more chain transfer agents,
0 to 3% of one or more non-reactive, monoreactive, di- or multireactive surfactants,
0.1 to 8% of one or more dichroic photoinitiators, preferably 0.5 to 5% of dichroic, very preferably liquid crystal, photoinitiators,
0 to 6%, preferably 0.1 to 5% of one or more non-dichroic photoinitiators.

The achiral and chiral polymerisable mesogenic mono-, di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive chiral and achiral polymerisable mesogenic compounds are shown in the following list of compounds, which should, however, be taken only as illustrative and is in no way intended to restrict, but instead to explain the present invention:

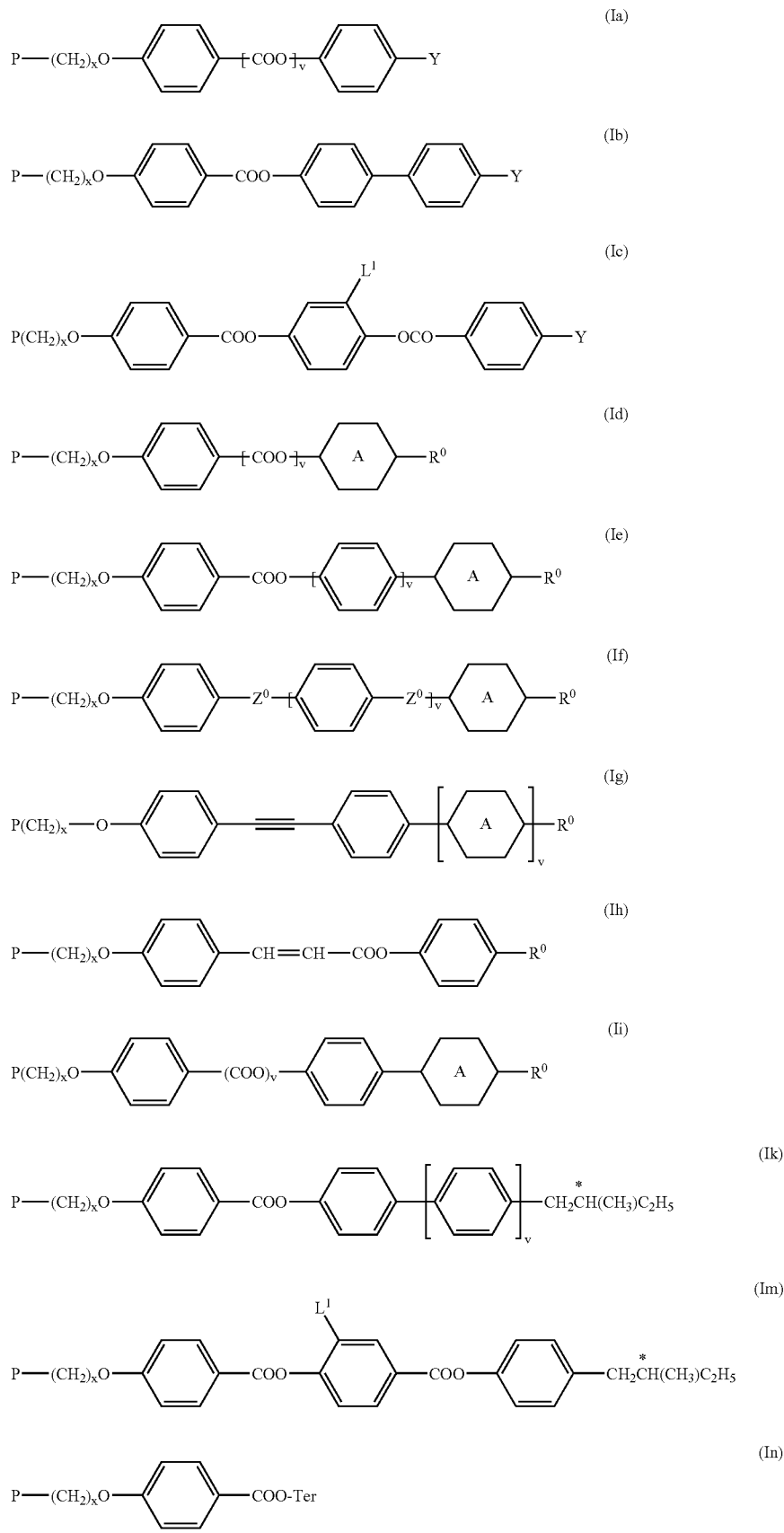

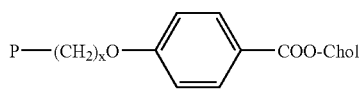
(Io)

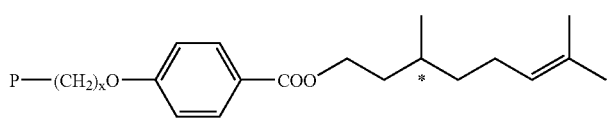
(Ip)

Examples of useful direactive chiral and achiral polymerisable mesogenic compounds are shown in the following list of compounds, which should, however, be taken only as illustrative and is in no way intended to restrict, but instead to explain the present invention In the above formulae, P is a polymerisable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—,

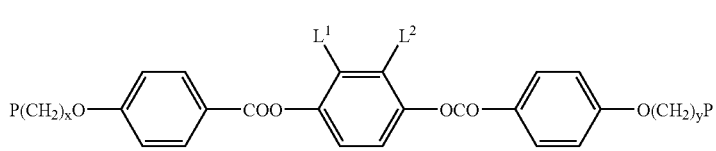
(IIa)

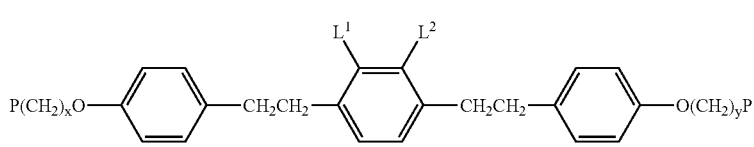
(IIb)

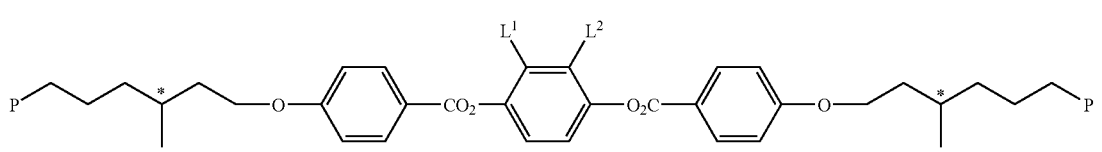
(IIc)

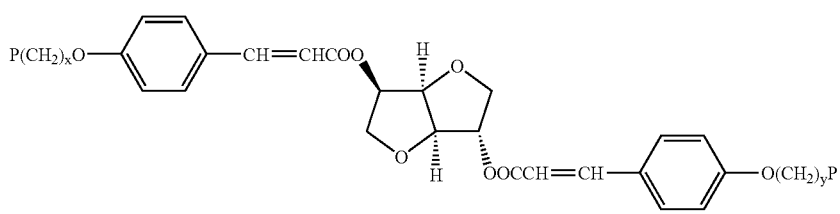
(IId)

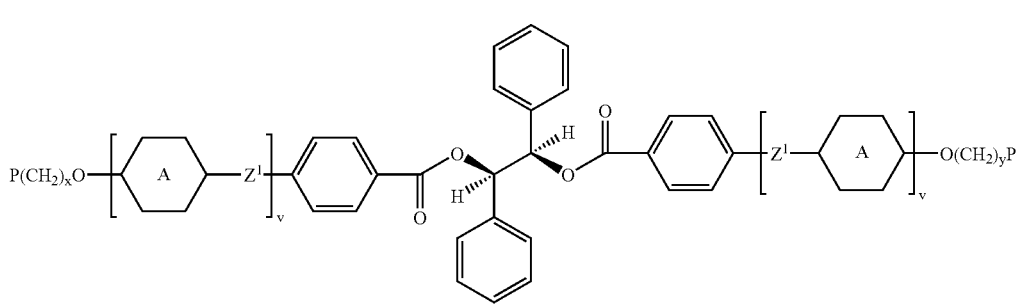
(IIe)

—OCO—, —CH₂CH₂— or a single bond, Y is a polar group, Ter is a terpenoid radical like e.g. menthyl, Chol is a cholesteryl group, R⁰ is an non-polar alkyl or alkoxy group, and L¹ and L² are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO₂, OH, OCH₃, OCN, SCN, an optionally fluorinated carbonyl or carboxyl group with up to 4 C atoms or a mono- oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

The polymerisable material may also comprise one or more non-polymerisable chiral dopants, which can also be mesogenic or liquid crystalline. Especially preferred are compounds comprising a chiral sorbitol group with attached mesogenic groups, in particular compounds as disclosed in WO 98/00428 with a high twisting power. Further suitable chiral compounds are e.g. the commercially available S 1011, R 811 or CB 15 (from Merck KGaA, Darmstadt, Germany).

Very preferred are chiral compounds selected from the following formulae

For preparation of a cholesteric film, the polymerisable LC material is preferably coated onto substrate, aligned into a uniform orientation and polymerised to permanently fix the cholesteric structure. As a substrate for example a glass or quarz sheet or a plastic film or sheet can be used. It is also possible to put a second substrate on top of the coated mixture prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerized film after polymerisation, preferably isotropic substrates are used.

Preferably at least one substrate is a plastic substrate such as for example a film of polyester such as polyethyleneterephthalate (PET) or polyethylenenaphthalate (PEN), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from DuPont Teijin Films under the trade name Melinex®.

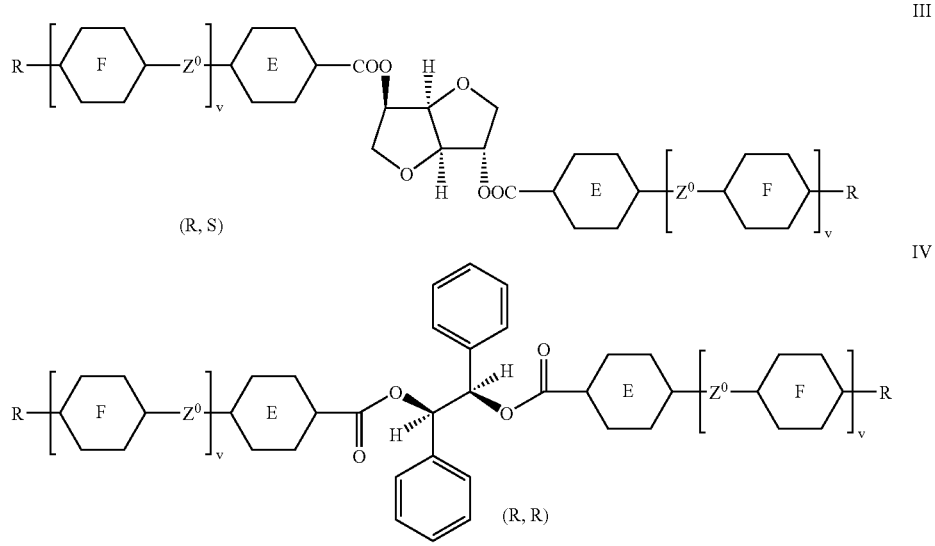

including the (R,S), (S,R), (R,R) and (S,S) enantiomers not shown, wherein E and F have each independently one of the meanings of A given above, v is 0 or 1, Z⁰ is —COO—, —OCO—, —CH₂CH₂— or a single bond, and R is alkyl, alkoxy, carbonyl or carbonyloxy with 1 to 12 C atoms.

The compounds of formula Iit are described in WO 98/00428, the compounds of formula IV are described in GB 2,328,207, the entire disclosure of which is incorporated into this application by reference.

Further preferred chiral dopants are chiral binapthyl derivatives as disclosed in EP 01111954.2, chiral binaphthol acetal derivatives as described in EP 00122844.4, EP 00123385.7 and EP 01104842.8, chiral TADDOL derivatives as disclosed in EP 00115249.5, and chiral dopants with at least one fluorinated bridging group and a terminal or central chiral group as disclosed in EP 00115250.3 and EP 00115251.1.

The polymerisable material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

Polymerisation of the LC material is preferably achieved by exposing it to actinic radiation. Actinic radiation means irradiation with light, like UV light, IR light or visible light, irradiation with X-rays or gamma rays or irradiation with high energy particles, such as ions or electrons. Preferably polymerisation is carried out by photoirradiation, in particular with UV light, very preferably with linear polarised UV light. As a source for actinic radiation for example a single UV lamp or a set of UV lamps can be used. When using a high lamp power the curing time can be reduced. Another possible source for photoradiation is a laser, like e.g. a UV laser, an IR laser or a visible laser.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiators are preferred, in particular radicalic UV photoinitiators.

For achieving helix distortion in the cholesteric film the polymerisable CLC mixture should preferably contain a dichroic photoinitiator, like for example a liquid crystal photoinitiator. As LC photoinitiator for example the following compound can be used:

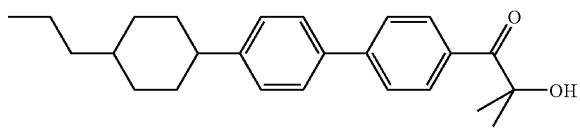

In addition to the dichroic photoinitiators the polymerisable mixture may also comprise one or more conventional photoinitators. As standard photoinitiator for radical polymerisation for example the commercially available Irgacure® 651, Irgacure® 184, Darocure® 1173 or Darocure® 4205 (all from Ciba Geigy AG) can be used, whereas in case of cationic photopolymerisation the commercially available UVI 6974 (Union Carbide) can be used.

The curing time is dependent, inter alia, on the reactivity of the polymerisable material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The polymerisable LC material can additionally comprise one or more other suitable components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The mixture may also comprise one or more dyes having an absorption maximum adjusted to the wavelength of the radiation used for polymerisation, in particular UV dyes like e.g. 4,4'-azoxy anisole or the commercially available Tinuvin (from Ciba AG, Basel, Switzerland).

In another preferred embodiment the mixture of polymerisable material comprises up to 70%, preferably 1 to 50% of a monoreactive non-mesogenic compound with one polymerisable functional group. Typical examples are alkylacrylates or alkylmethacrylates.

It is also possible, in order to increase crosslinking of the polymers, to add up to 20% of a non-mesogenic compound with two or more polymerisable functional groups to the polymerisable LC material alternatively or in addition to the di- or multireactive polymerisable mesogenic compounds to increase crosslinking of the polymer. Typical examples for direactive non-mesogenic monomers are alkyldiacrylates or alkyldimethacrylates with alkyl groups of 1 to 20 C atoms. Typical examples for multireactive non-mesogenic monomers are trimethylpropanetrimethacrylate or pentaerythritoltetraacrylate.

It is also possible to add one or more chain transfer agents to the polymerisable material in order to modify the physical properties of the inventive polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or liquid crystalline thiol compounds. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

For preparing the cholesteric film, it is necessary to achieve planar alignment of the chiral polymerisable material, i.e. with the helical axis being oriented substantially perpendicular to the plane of the film. Planar alignment can be achieved for example by shearing the material, e.g. by means of a doctor blade. It is also possible to apply an alignment layer, for example a layer of rubbed polyimide or sputtered $SiO_x$, on top of at least one of the substrates. Planar alignment can also be achieved by rubbing the substrate without applying an additional alignment layer, e.g. by means of a rubbing cloth or a rubbing roller. Planar alignment with a low tilt angle can also be achieved by adding one or more surfactants to the polymerizable mesogenic material. Suitable surfactants are described for example in J. Cognard, Mol. Cryst. Liq. Cryst. 78, Supplement 1, 1-77 (1981). Particularly preferred are non-ionic surfactants, e.g. non-ionic fluorocarbon surfactants, like the commercially available Fluorad® (from 3M), or Zonyl FSN® (from DuPont).

In some cases it is of advantage to apply a second substrate to aid alignment and exclude oxygen that may inhibit the polymerisation. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerisation of the polymerisable material is carried out under an atmosphere of inert gas, preferably under a nitrogen atmosphere.

The examples below serve to illustrate the invention without limiting it. In the foregoing and the following, all temperatures are given in degrees Celsius, and all percentages are by weight, unless stated otherwise.

EXAMPLES

Manufacturing of Biaxial CLC Films

Example 1

The following polymerisable mixture was prepared

| | |
|---|---|
| Compound (1) (monoreactive chiral) | 63.0% |
| Compound (2) (direactive achiral) | 20.0% |
| Compound (3) (monoreactive achiral) | 7.8% |
| Compound (4) (non-reactive chiral) | 5.0% |
| Compound (5) (chain transfer agent) | 2.0% |
| Compound (6) (dichroic photoinitiator) | 2.0% |
| FC171 ® (surfactant) | 0.2% |

FC171® is a non-polymerisable fluorocarbon surfactant commercially available from 3M (St. Paul, Minn., USA). The preparation of the chiral dopant (4) is described in EP 01111954.2.

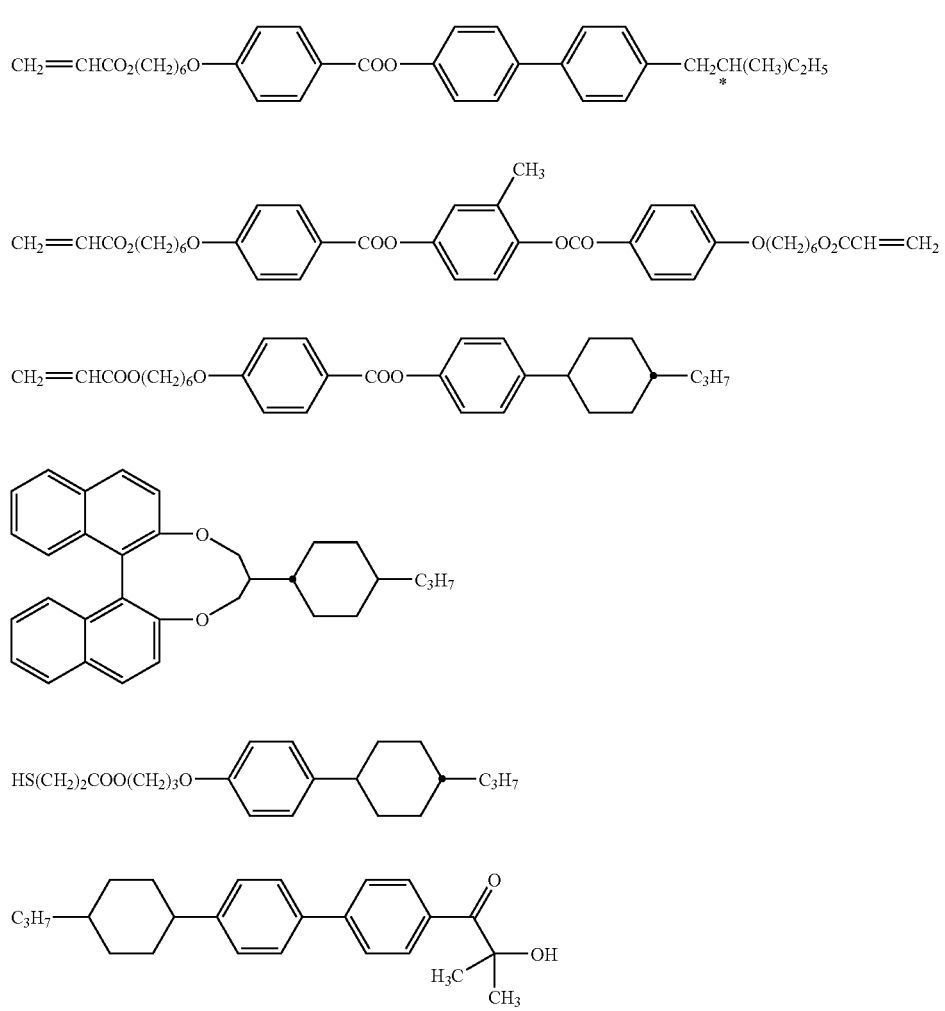

Figure 4A:
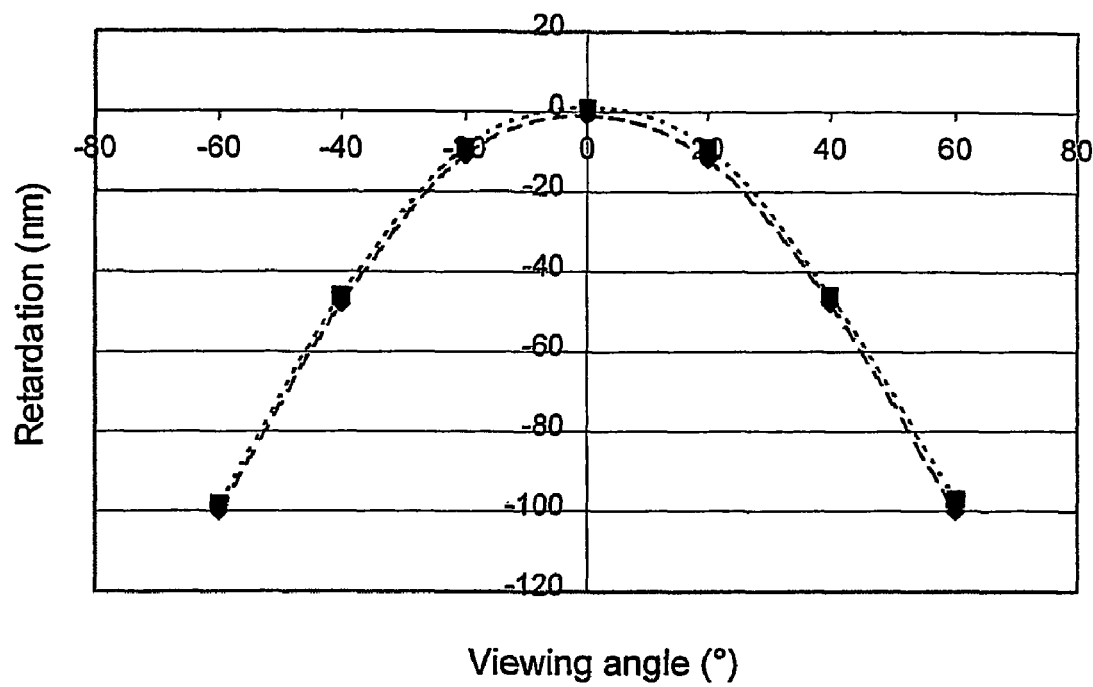
FIG. 4 shows the retardation versus viewing angle of a cholesteric film prepared according to example 1 by photopolymerisation with unpolarised (A) and polarised light (B).
Figure 4B:
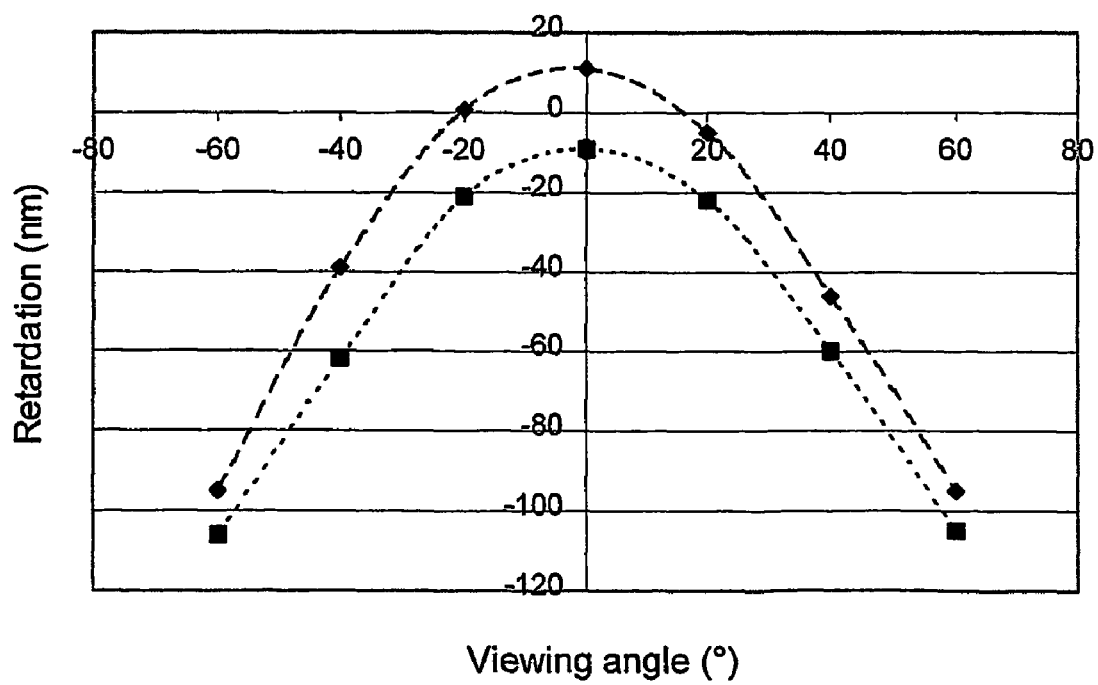

The mixture was dissolved in 7:3 toluene/cyclohexanone to give a 50% w/w solution. A PVA coated TAC (triacetyl cellulose) substrate was prepared by rubbing. The solution was coated onto the substrate using a wire-wound bar to give a wet film of approximately 10 μm. The solvent was allowed to evaporate and a second PVA coated TAC substrate placed on top. The resultant coating was polymerised at 80° C. by exposing to 0.8 mWcm$^{-2}$ of unpolarised UV (365 nm) irradiation to give film 1A. A second coating was prepared in the same way and polymerised by exposing to linearly polarised UV (365 nm) irradiation to give film 1B. The retardation (nm) versus viewing angle (degrees) of films 1A and 1B is shown in FIGS. 4A and 4B, respectively. The retardation of film 1A is substantially independent of the viewing-angle. The in-plane anisotropy of film 1B is represented by the on-axis retardation (~10 nm) in FIG. 4B. The out-of plane, negative C retardation of film 1B is evident in FIG. 4B from the off-axis reduced retardation in all directions.

Example 2

The following polymerisable mixture was prepared

| | |
|---|---|
| Compound (7) (direactive achiral) | 51.5% |
| Compound (8) (monoreactive achiral) | 8.0% |
| Compound (9) (monoreactive achiral) | 21.0% |
| Compound (2) | 12.0% |
| Compound (4) | 6.0% |
| Compound (6) | 1.0% |
| FC171 ® | 0.2% |

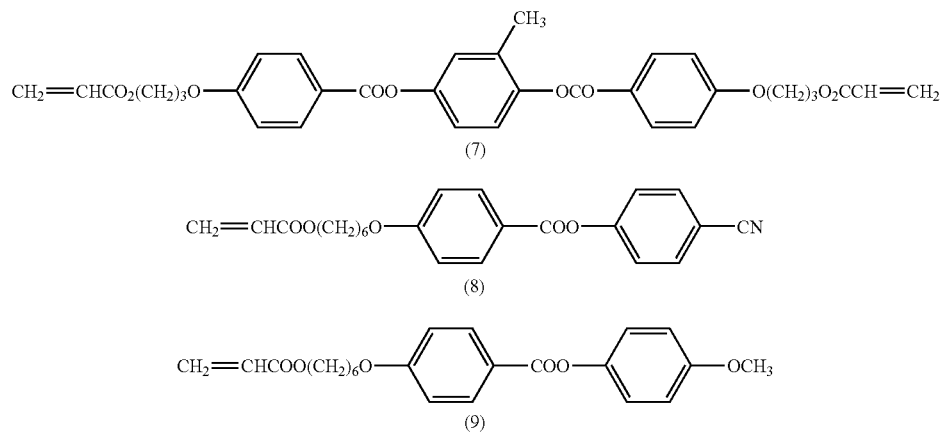

Figure 5A:
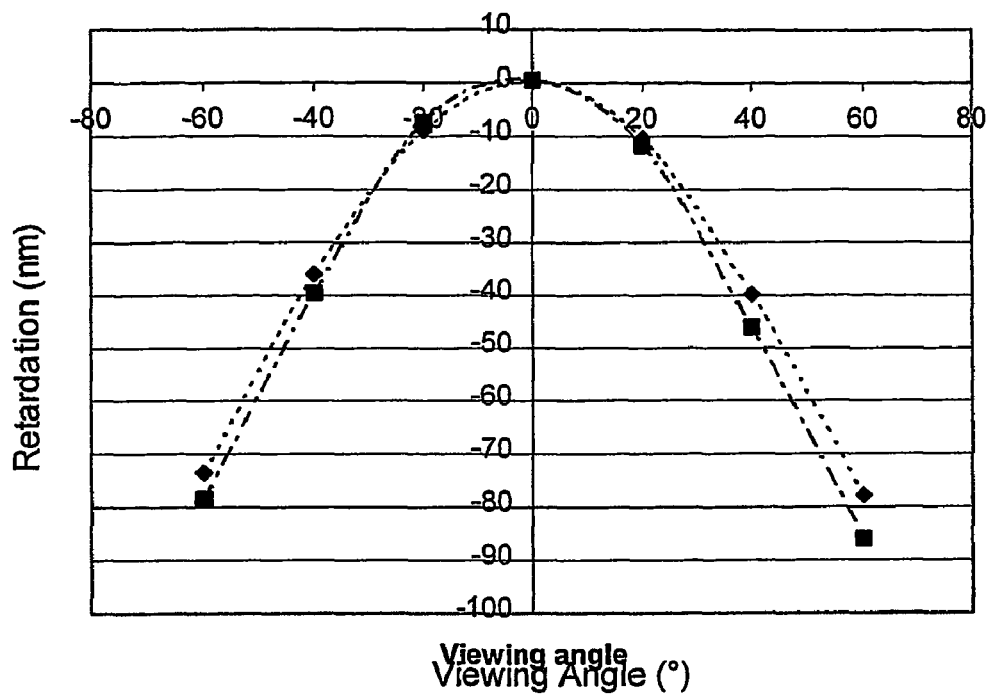
FIG. 5 shows the retardation versus viewing angle of a cholesteric film prepared according to example 2 by photopolymerisation with unpolarised (A) and polarised light (B).
Figure 5B:
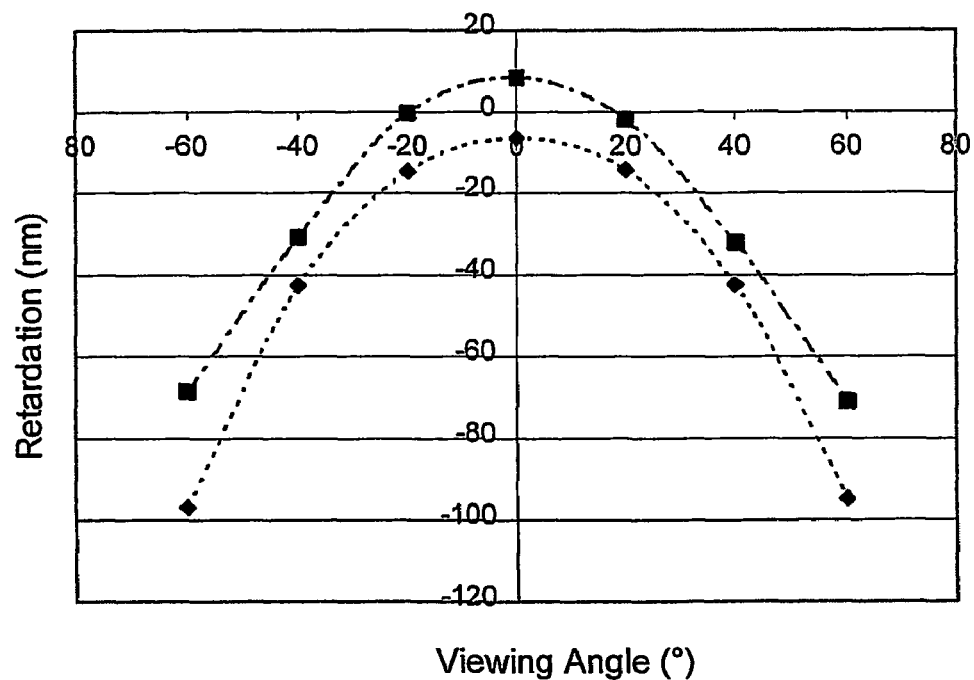
Figure 6A:
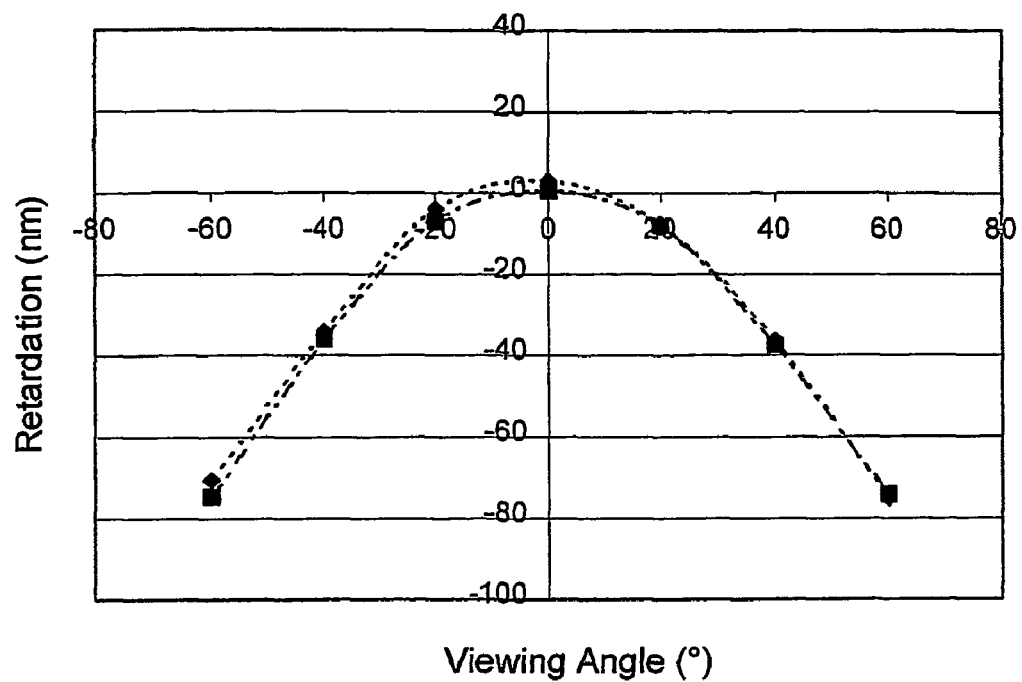
FIG. 6 shows the retardation versus viewing angle of a cholesteric film prepared according to example 3 by photopolymerisation with unpolarised (A) and polarised light (B).
Figure 6B:
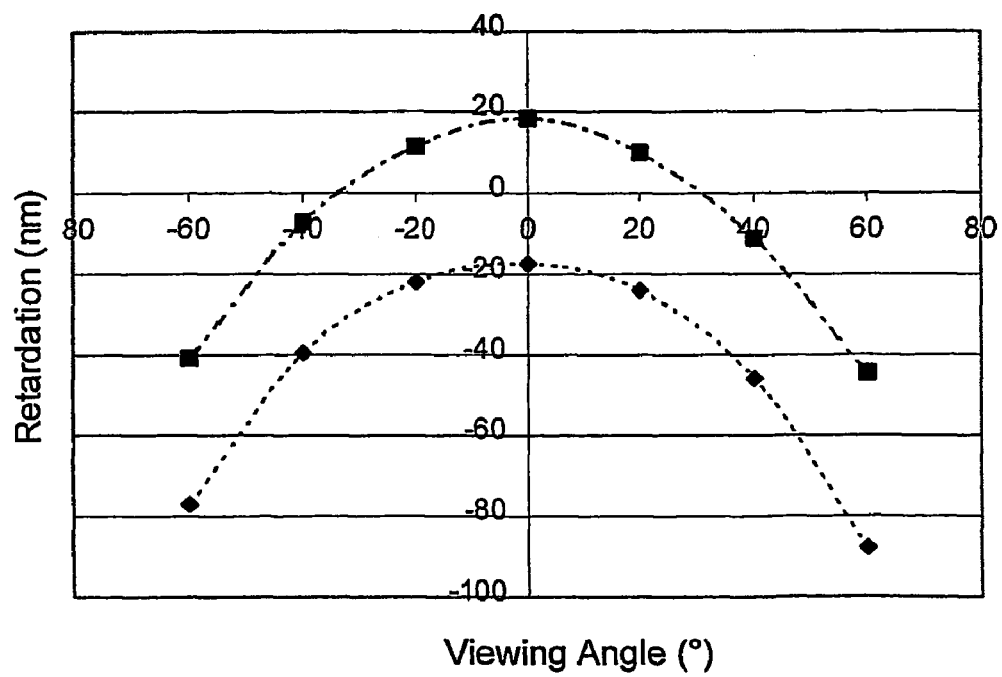

The mixture was dissolved in 7:3 toluene/cyclohexanone to give a 50% w/w solution. A PVA coated TAC (triacetyl cellulose) substrate was prepared by rubbing. The solution was coated onto the substrate using a wire-wound bar to give a wet film of approximately 6 μm. The solvent was allowed to evaporate and a second PVA coated TAC substrate place on top. The resultant coating was polymerised at 80° C. by exposing to 0.8 mWcm$^{-2}$ of unpolarised UV (365 nm) irradiation to give film 2A. A second coating was prepared in the same way and polymerised by exposing to linearly polarised UV (365 nm) irradiation to give film 2B. The retardation (nm) versus viewing angle (degrees) of films 2A and 2B is shown in FIGS. 5A and 6B, respectively. The retardation of film 2A is substantially independent of the viewing-angle. The in-plane anisotropy of film 2B is represented by the on-axis retardation (~10 nm) in FIG. 5B. The out-of plane, negative C retardation of film 2B is evident in FIG. 5B from the off-axis reduced retardation in all directions.

Example 3

The following polymerisable mixture was prepared

| | |
|---|---|
| Compound (7) | 50.5% |
| Compound (8) | 8.0% |
| Compound (9) | 19.0% |
| Compound (2) | 10.0% |
| Paliocolor LC756 ® (reactive chiral) | 6.0% |
| Compound (6) | 2.0% |
| FC171 ® | 0.5% |

Paliocolor LC756® is a direactive polymerisable chiral compound commercially available from BASF AG (Ludwigshafen, Germany).

The mixture was dissolved in 7:3 toluene/cyclohexanone to give a 50% w/w solution. A TAC (triacetyl cellulose) substrate was prepared by rubbing. The solution was coated onto the substrate using a wire-wound bar to give a wet film of approximately 5 μm. The solvent was allowed to evaporate and a second TAC substrate placed on top The resultant film was polymerised at 25° C. by exposing to 40 mWcm$^{-2}$ of unpolarised UV (365 nm) irradiation to give film 3A. A second coating was prepared in the same way and polymerised by exposing to linearly polarised UV (365 nm) irradiation to give film 3B. The retardation (nm) versus viewing angle (degrees) of films 3A and 3B is shown in FIGS. 6A and 6B, respectively. The retardation of film 3A is substantially independent of the viewing-angle. The in-plane anisotropy of film 3B is represented by the on-axis retardation (~10 nm) in FIG. 6B. The out-of plane, negative C retardation of film 3B is evident in FIG. 6B from the off-axis reduced retardation in all directions.

Use Examples

Compensation of LCDs with Biaxial CLC Films

Figure 8A:
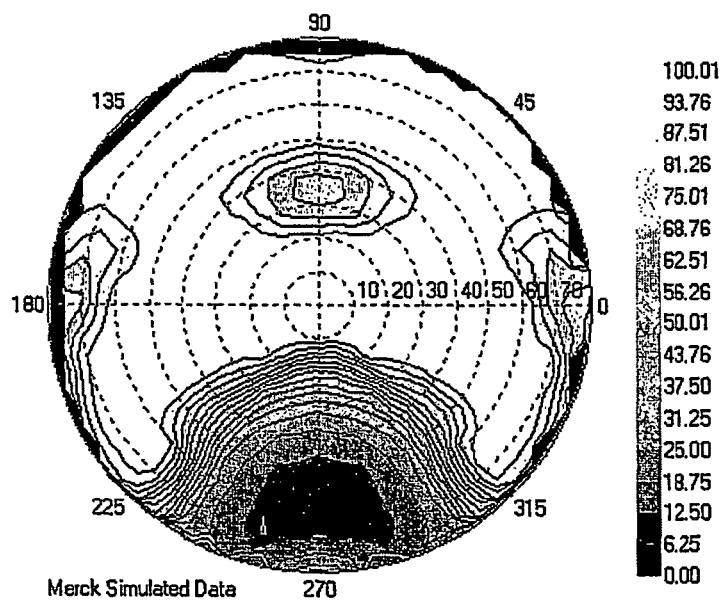
FIGS. 8A, 8B and 8C show the isocontrast plots of compensated TN-LCDs according to example 4A, 4B and 4C, respectively.

The following abbreviations are used:
$\theta_{max}$: maximum tilt angle
$\theta_{min}$: minimum tilt angle
out: =outwards, surface of the film facing the polarisers
in: =inwards, surface of the film facing the LC cell
d: film thickness
OA: orientation direction of the stretch axis in case of a polariser, the optical axis in case of a retardation film, the LC molecules at the surface of an LC cell, the direction of $n_x$ in case of a biaxial film Example 4A Comparison Example TN-LCD A compensated TN-LCD with a configuration as shown in FIG. 7A and a backlight on top of the stack has the following parameters Polariser 1: stretched type, OA=45°
O-Plate 1: splayed structure, $\theta_{max}$ (out) 88°, $\theta_{min}$ (in) 2°, linear tilt gradient, OA=225°, d=1332 nm, $n_o$=1.50, $n_e$=1.62
A-Plate 1: OA=135°, d=1222 nm, $n_o$=1.50, $n_e$=1.62
−C-Plate 1: d=896 nm, $n_o$=1.56, $n_e$=1.50
LC Cell: d=4750 nm, OA=45°(1), 135°(2), O-mode (=orientation at each surface (1,2) parallel to stretch axis of respective nearest polariser(1,2)), standard TN director distributions
−C-Plate 2: d=896 nm, $n_o$=1.56, $n_e$=1.50
A-Plate 2: OA=225°, d=1222 nm, $n_o$=1.50, $n_e$=1.62
O-Plate 2: splayed structure, $\theta_{max}$ (out) 88°, $\theta_{min}$ (in) 2°, linear tilt gradient, OA=135°, d=1332 nm, $n_o$=1.50, $n_e$=1.62
Polariser 2: stretched type, OA=315° and has an isocontrast plot as shown in FIG. 8A.

Example 4B

Comparison Example TN-LCD

Figure 8B:
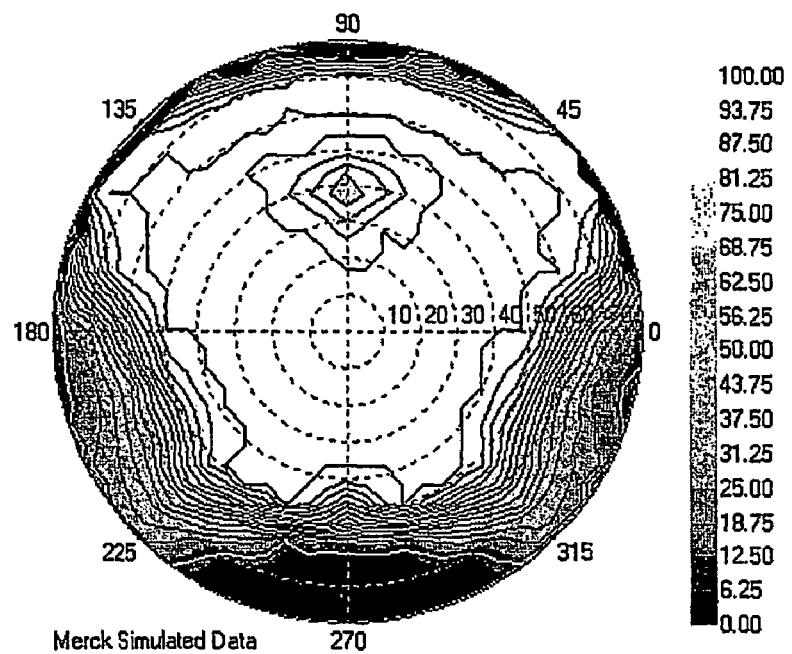

A compensated TN-LCD with a configuration as shown in FIG. 7B and a backlight on top of the stack has the following parameters Polariser 1: stretched type, OA=45°
O-Plate 1: splayed structure, $\theta_{max}$ (out) 88°, $\theta_{min}$ (in) 2°, linear tilt gradient, OA=225°, d=1093 nm, $n_o$=1.50, $n_e$=1.62
−C-Plate 1: d=1000 nm, $n_o$=1.56, $n_e$=1.50
A-Plate 1: OA=135°, d=954 nm, $n_o$=1.50, $n_e$=1.62
LC Cell: d=4750 nm, OA=45°(1), 135°(2), O-mode, standard TN director distributions
A-Plate 2: OA=225°, d=954 nm, $n_o$=1.50, $n_e$=1.62
−C-Plate 2: d=1000 nm, $n_o$=1.56, $n_e$=1.50
O-Plate 2: splayed structure, $\theta_{max}$ (out) 88°, $\theta_{min}$ (in) 2°, linear tilt gradient, OA=135°, d=1093 nm, $n_o$=1.50, $n_e$=1.62
Polariser 2: stretched type, OA=315° and has an isocontrast plot as shown in FIG. 8B.

Example 4C

Use Example TN-LCD

Figure 8C:
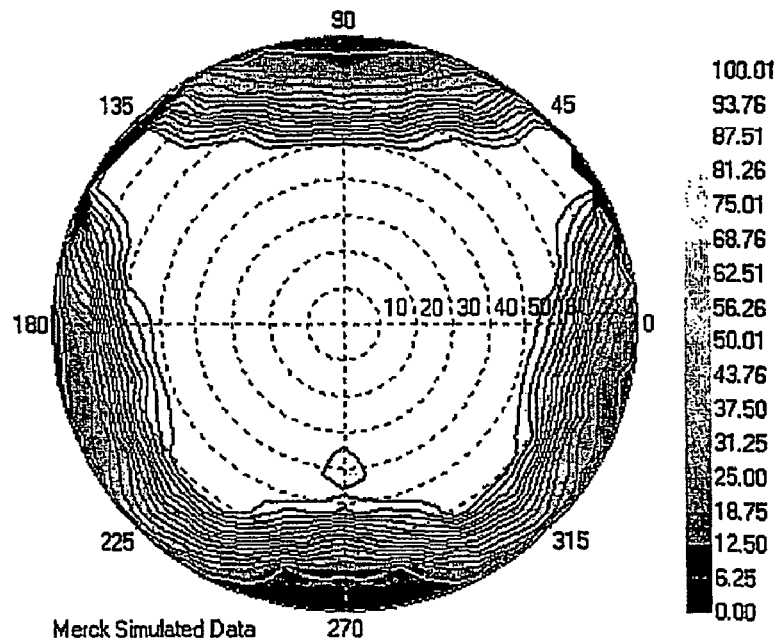

A compensated TN-LCD with a configuration as shown in FIG. 7C and a backlight on top of the stack has the following parameters Polariser 1: stretched type, OA 45°
O-Plate 1: splayed structure, $\theta_{max}$ (out) 88°, $\theta_{min}$ (in) 2°, linear tilt gradient, OA=225°, d=1200 nm, $n_o$=1.50, $n_e$=1.62
Biaxial film1: OA=225°, d=1100 nm, $n_x$=1.643, $n_y$=1.541, $n_z$=1.495
LC Cell: d=4750 nm, OA=45°(1), 135°(2), O-mode, standard TN director distributions
Biaxial film2: OA=135°, d=1100 nm, $n_x$=1.643, $n_y$=1.541, $n_z$=1.495
O-Plate 2: splayed structure, $\theta_{max}$ (out) 88°, $\theta_{min}$ (in) 2°, linear tilt gradient, OA=135°, d=1200 nm, $n_o$=1.50, $n_e$=1.62
Polariser 2: stretched type, OA=315° and has an isocontrast plot as shown in FIG. 8C.

Example 5A

Comparison Example MVA-LCD

Figure 10A:
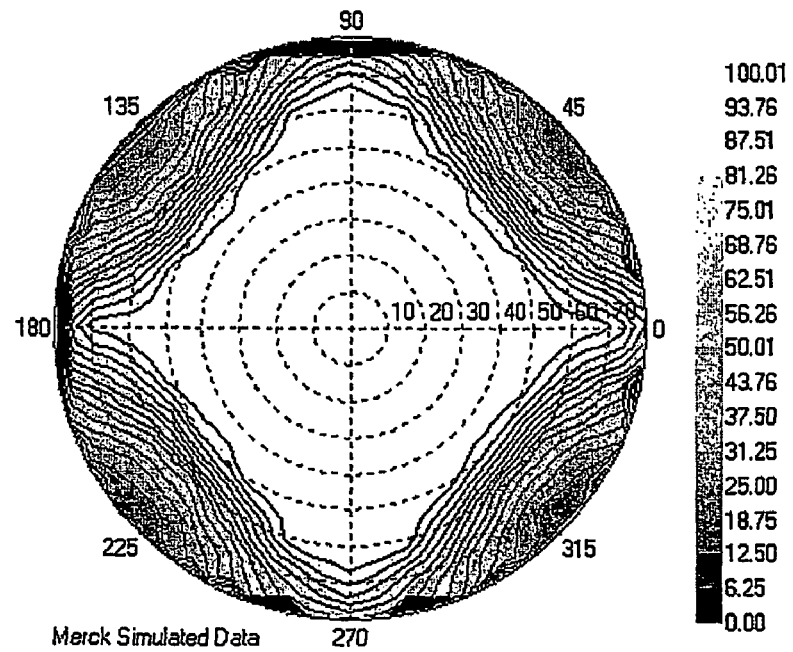
FIGS. 10A and 10B show the isocontrast plots of compensated MVA-LCDs according to example 5A, 5B and 5C, respectively.

A compensated MVA-LCD with a configuration as shown in FIG. 9A and a backlight on top of the stack has the following parameters Polariser 1: stretched type, OA=90°
A-Plate: OA=90°, d=725 nm, $n_o$=1.50, $n_e$=1.62
−C-Plate: d=2500 nm, $n_o$=1.56, $n_e$=1.50
LC Cell: d=3000 nm, four vertically aligned domains (45°, 135°, 225°, 315°), standard MVA director distributions
Polariser 2: stretched type, OA=0° and has an isocontrast plot as shown in FIG. 10A.

Example 5B

Use Example MVA-LCD

Figure 10B:
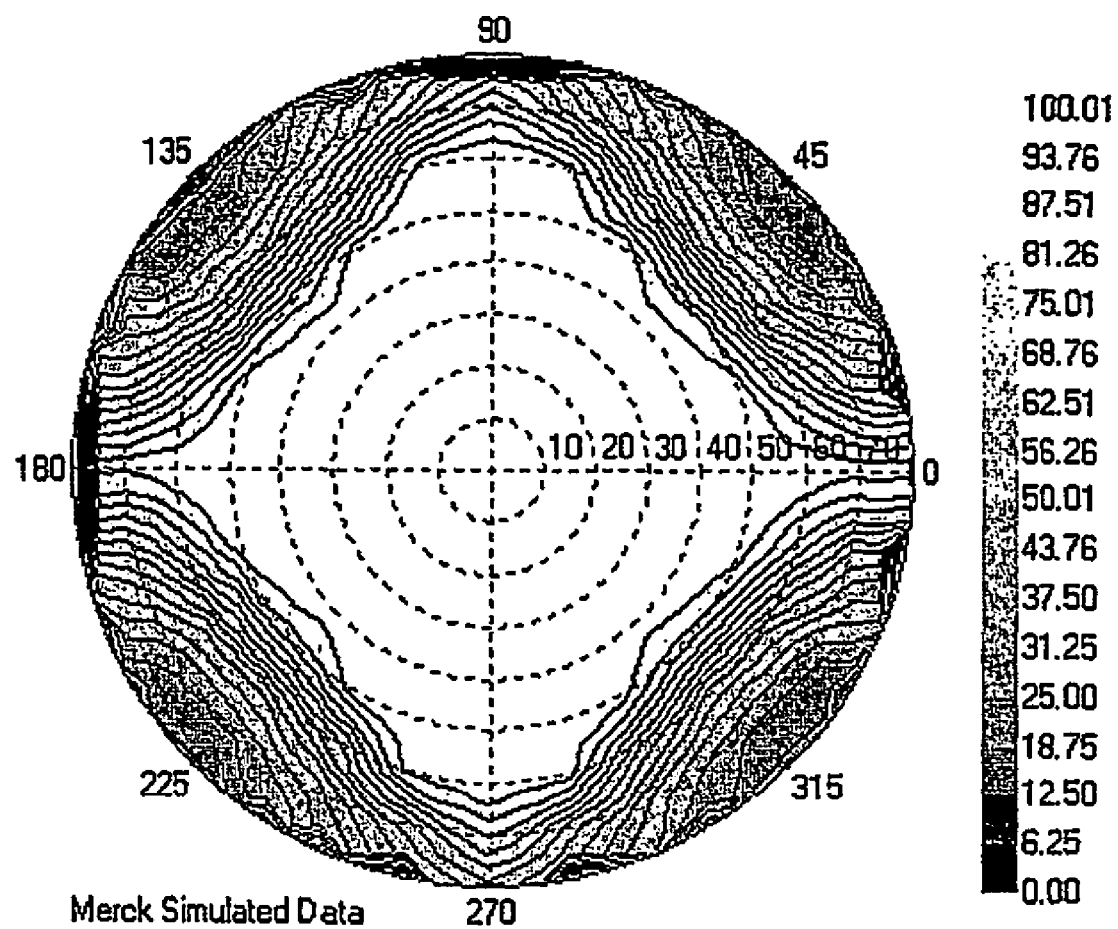

A compensated MVA-LCD with a configuration as shown in FIG. 9B and a backlight on top of the stack has the following parameters Polariser 1: stretched type, OA=90°
Biaxial film1: OA=90°, d=2277 nm, $n_x$=1.583, $n_y$=1.610, $n_z$=1.495
LC Cell: d=3000 nm, four vertically aligned domains (45°, 135°, 225°, 315°), standard MVA director distributions
Polariser 2: stretched type, OA=0° and has an isocontrast plot as shown in FIG. 10B.

Example 6A

Comparison Example OCB-LCD

Figure 12A:
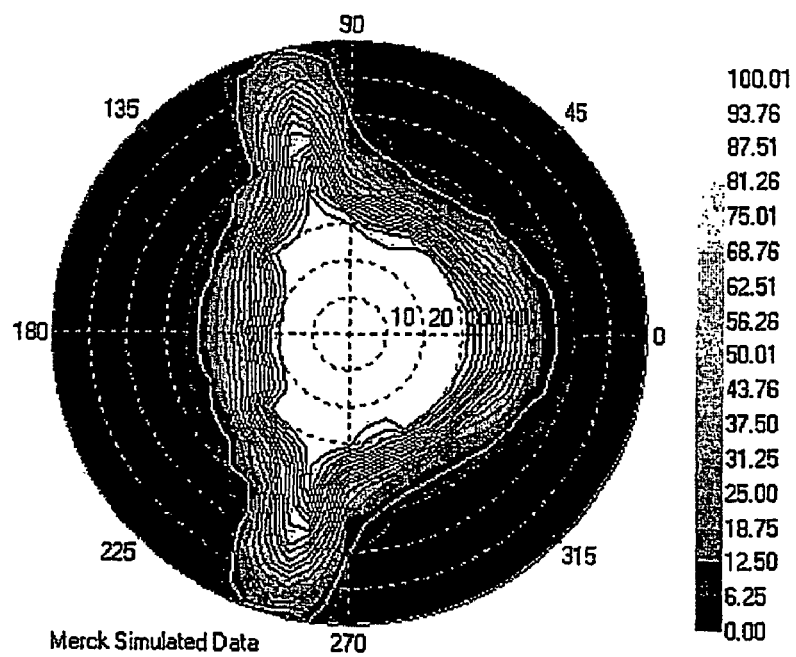
FIGS. 12A and 12B show the isocontrast plots of compensated OCB-LCDs according to example 6A, 6B and 6C, respectively.

A compensated OCB-LCD with a configuration as shown in FIG. 11A and a backlight on top of the stack has the following parameters Polariser 1: stretched type, OA=45°
A-Plate 1: OA=90°, d=265 nm, $n_o$=1.50, $n_e$=1.62
−C-Plate 1: d=4655 nm, $n_o$=1.56, $n_e$=1.50
LC Cell: d=4000 nm, OA=0° (1), 180° (2), standard OCB director distributions
−C-Plate 2: d=4655 nm, $n_o$=1.56, $n_e$=1.50
A-Plate 2: OA=90°, d=265 nm, $n_o$=1.50, $n_x$=1.62
Polariser 2: stretched type, OA=315° and has an isocontrast plot as shown in FIG. 12A.

Example 6B

Use Example OCB-LCD

Figure 12B:
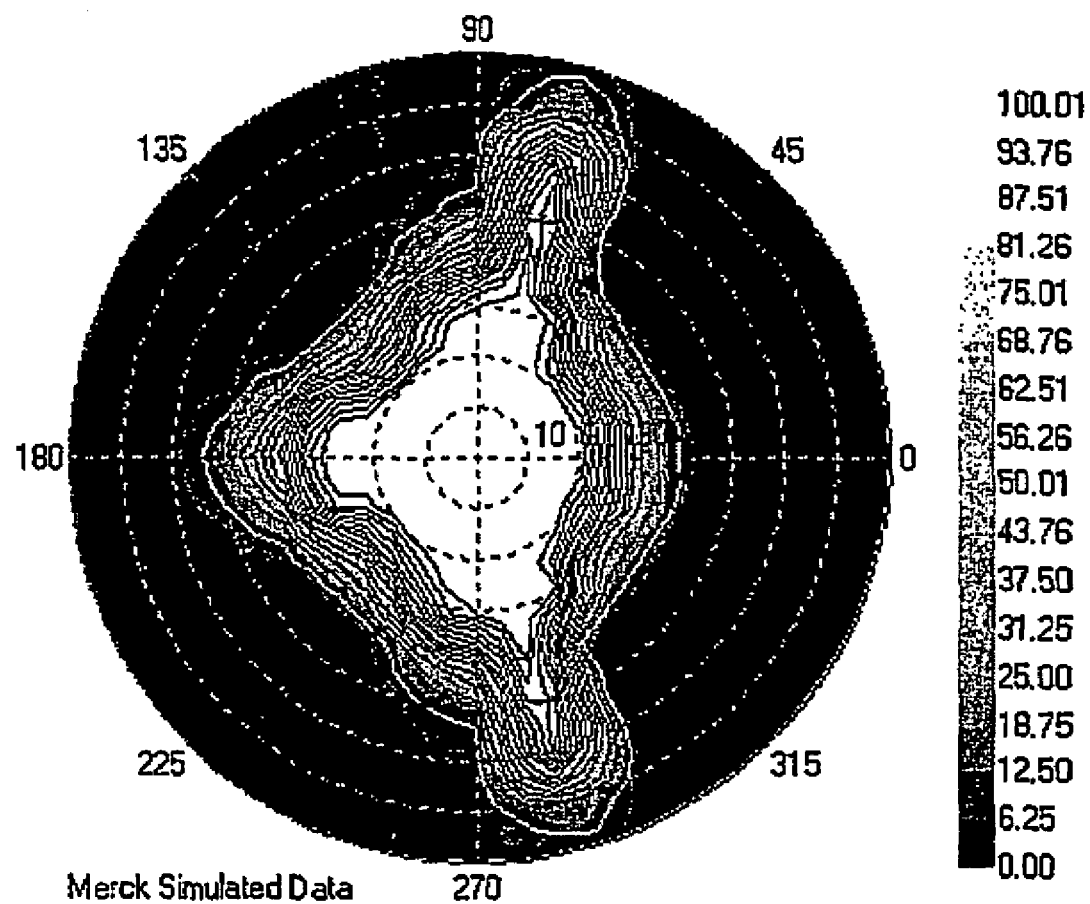

A compensated OCB-LCD with a configuration as shown in FIG. 11B and a backlight on top of the stack has the following parameters Polariser 1: stretched type, OA=45°
Biaxial film1: OA=90°, d=960 nm, $n_x$=1.865, $n_y$=1.615, $n_z$=1.446
LC Cell: d=4000 nm, OA=0° (1), 180° (2), standard OCB director distributions
Biaxial film2: OA=90°, d=960 nm, $n_x$=1.865, $n_y$=1.615, $n_z$=1.446
Polariser 2: stretched type, OA=315° and has an isocontrast plot as shown in FIG. 12B.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A biaxial film having a cholesteric structure and a deformed helix with an elliptical refractive index ellipsoid, which reflects light of a wavelength of less than 380 nm.

2. A biaxial film according to claim 1, having $n_x$ and $n_y$ as the principal refractive indices in orthogonal directions in the film plane and $n_z$ as the principal refractive index perpendicular to the film plane, wherein $n_x \neq n_y \neq n_z$ and $n_x$, $n_y > n_z$.

3. A biaxial film according to claim 1, which is substantially transparent for light with a wavelength of 380 nm or higher.

4. A biaxial film according to claim 1, which comprises a crosslinked cholesteric polymer.

5. A biaxial film according to claim 1, obtainable by providing a layer of a chiral polymerizable liquid crystal material on a substrate, photopolymerizing the polymerizable material that is homogeneously oriented in its liquid crystal phase by exposure to linear polarized light, and optionally removing the polymerized material from the substrate, wherein the chiral polymerizable liquid crystal material comprises at least one dichroic photoinitiator and at least one achiral polymerizable and at least one chiral polymerizable or non-polymerizable compound.

6. A biaxial film according to claim 5, wherein the chiral polymerizable liquid crystal material comprises
   a) at least one polymerizable mesogenic compound having at least one polymerizable group,
   b) at least one chiral compound which may also be polymerizable and/or mesogenic, and which may be one of the compounds of component a) or an additional compound,
   c) at least one dichroic photoinitiator,
   d) optionally one or more non-mesogenic compounds having one, two or more polymerizable groups,
   e) optionally one or more non-dichroic photoinitiators,
   f) optionally one or more dyes showing an absorption maximum at a wavelength used to initiate photopolymerization,
   g) optionally one or more chain transfer agents, and
   h) optionally one or more surface-active compounds.

7. A biaxial film according to claim 5, wherein the chiral polymerizable liquid crystal material comprises at least one monoreactive chiral polymerizable mesogenic compound and at least one mono-, di- or multireactive achiral polymerizable mesogenic compound.

8. A biaxial film according to claim 5, wherein the chiral polymerizable liquid crystal material comprises at least one di- or multireactive chiral polymerizable mesogenic compound and at least one mono-, di- or multireactive achiral polymerizable mesogenic compound.

9. A biaxial film according to claim 5, wherein the chiral polymerizable liquid crystal material comprises at least one non-reactive chiral compound and at least one mono-, di- or multireactive achiral polymerizable mesogenic compound.

10. A method for preparing a biaxial film as described in claim 5, comprising providing a layer of a chiral polymerizable liquid crystal material on a substrate, photopolymerizing the polymerizable material that is homogeneously oriented in its liquid crystal phase by exposure to linear polarized light, and optionally removing the polymerized material from the substrate, wherein the chiral polymerizable liquid crystal material comprises at least one dichroic photo initiator and at least one achiral polymerizable and at least one chiral polymerizable or non-polymerizable compound.

11. A method for providing a retardation or compensation film in an optical device or liquid crystal display, comprising providing for said device or liquid crystal display a biaxial film according to claim 1.

12. A compensator comprising at least one biaxial film according to claim 1.

13. A compensator according to claim 12, further comprising at least one retardation film with splayed or tilted structure.

14. A liquid crystal display comprising at least one biaxial film according to claim 1, or a compensator comprising said at least one biaxial film and at least one retardation film with spayed or tilted structure.

15. A liquid crystal display comprising the following elements
   a liquid crystal cell formed by two transparent substrates having surfaces which oppose each other, an electrode layer provided on the inside of at least one of said two transparent substrates and optionally superposed with an alignment layer, and a liquid crystal medium which is present between the two transparent substrates,
   a polarizer arranged outside said transparent substrates, or a pair of polarizers sandwiching said substrates, and
   at least one biaxial film according to claim 1 or a compensator comprising said at least one biaxial film, being situated between the liquid crystal cell and at least one of said polarizers,
   it being possible for the above elements to be, each independently, separated, stacked, mounted on top of each other or connected by an adhesive layer.

16. A liquid crystal display according to claim 14, which is a display of the TN (twisted nematic), OCB (optically compensated bend), pi-cell, VA (vertically aligned) or MVA (multi-domain vertically aligned) mode.

17. A biaxial film according to claim 1, which is substantially transparent for light with a wavelength of visible light of 380 to 780 nm.

* * * * *